US010462343B2

(12) United States Patent
McCain et al.

(10) Patent No.: US 10,462,343 B2
(45) Date of Patent: Oct. 29, 2019

(54) MULTI-ARRAY CAMERA IMAGING SYSTEM AND METHOD THEREFOR

(71) Applicant: Aqueti Incorporated, Durham, NC (US)

(72) Inventors: Scott Thomas McCain, Durham, NC (US); David Jones Brady, Durham, NC (US)

(73) Assignee: Aqueti Incorporated, Durham, NC (US)

( * ) Notice: Subject to any disclaimer, the term of this patent is extended or adjusted under 35 U.S.C. 154(b) by 0 days.

(21) Appl. No.: 15/551,805

(22) PCT Filed: Mar. 13, 2016

(86) PCT No.: PCT/US2016/022239
§ 371 (c)(1),
(2) Date: Aug. 17, 2017

(87) PCT Pub. No.: WO2016/149157
PCT Pub. Date: Sep. 22, 2016

(65) Prior Publication Data
US 2018/0035033 A1 Feb. 1, 2018

Related U.S. Application Data

(60) Provisional application No. 62/132,861, filed on Mar. 13, 2015.

(51) Int. Cl.
*H04N 5/225* (2006.01)
*G06T 7/00* (2017.01)
(Continued)

(52) U.S. Cl.
CPC ......... *H04N 5/2258* (2013.01); *G06T 1/0007* (2013.01); *G06T 3/4038* (2013.01);
(Continued)

(58) Field of Classification Search
CPC .... H04N 5/2258; H04N 5/23206; G06T 7/80; G06T 3/4038; G06T 7/97
See application file for complete search history.

(56) References Cited

U.S. PATENT DOCUMENTS

| 2012/0169842 | A1* | 7/2012 | Chuang ............ G08B 13/19619 348/39 |
| 2013/0060912 | A1* | 3/2013 | Rensin ............. G06F 17/30041 709/219 |

FOREIGN PATENT DOCUMENTS

| WO | 2009137616 A2 | 11/2009 |
| WO | 2012082127 A1 | 6/2012 |

OTHER PUBLICATIONS

Authorized Officer: Poquet, Rosa, "International Search Report and Written Opinion" issued in co-pending PCT application No. PCT/US2016/022239, dated Jul. 5, 2016.
(Continued)

*Primary Examiner* — Ahmed A Berhan
(74) *Attorney, Agent, or Firm* — Kaplan Breyer Schwarz, LLP

(57) ABSTRACT

An imaging system and method for enabling the capture and rendering of an image without the latency and bandwidth requirements of the prior art is presented. Embodiments of the present invention employ a plurality of imagers that provide image data to a plurality of capture and hosting servers to which they are connected via a first communications bus. One or more rendering systems are interconnected to the plurality of servers via a second communications bus. The servers perform parallel processing of only raw image data necessary to satisfy individual rendering requests from the rendering systems. Since image processing is performed only on the image data required to render the particular view of interest, an entire high-resolution image is not formed to satisfy the rendering request and the desired image can be
(Continued)

rendered with less latency and requires less bandwidth for transmission to the rendering system.

10 Claims, 4 Drawing Sheets

(51) Int. Cl.
*G06T 7/80* (2017.01)
*H04N 5/232* (2006.01)
*G06T 1/00* (2006.01)
*G06T 3/40* (2006.01)

(52) U.S. Cl.
CPC .................. *G06T 7/80* (2017.01); *G06T 7/97* (2017.01); *H04N 5/23206* (2013.01)

(56) References Cited

OTHER PUBLICATIONS

Jayampathi S. Rajapaksage, "Data Aggregation through Web Service Composition in Smart Camera Networks", XP055249305, http://scholarworks.gsu.edu/cgi/viewcontent.cgi?article=1069&context=cs_theses, dated Dec. 14, 2010, pp. 0-85, Publisher: Georgia State University, Published in: US.
Bennett Wilburn, "High Performance Imaging Using Arrays of Inexpensive Cameras", XP055116369, http://graphics.stanford.edu/~wilburn/wilburn_thesis.pdf, dated Dec. 31, 2004, pp. 26-28, 61-71.
Blaise Aguera Y Arcas, "How PhotoSynth can connect the world's images", XP055280653, https://www.ted.com/talks/blaise_aguera_y_arcas_demos_photosynth/transcript?language=en, dated May 31, 2007, pp. 1-3, Publisher: TED.com.

* cited by examiner

MULTI-ARRAY CAMERA IMAGING SYSTEM AND METHOD THEREFOR

CROSS REFERENCE TO RELATED APPLICATIONS

This case claims priority of U.S. Provisional Patent Application Ser. No. 62/132,861, filed Mar. 13, 2015, which is incorporated by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to imaging in general, and, more particularly, to forming images with camera systems having a plurality of focal-plane arrays.

BACKGROUND OF THE INVENTION

Prior to the development of digital imaging systems, cameras were based on a lens and a film-based a photographic emulsion located at the focal plane of the lens. An optical image of a scene would be projected onto the emulsion, which would permanently record the image via a chemical-based process. The advent of digital imaging has enabled advances in the way that an image of a scene can be recorded and viewed, however. In particular, a modern camera forms an image of a scene by temporarily digitally recording the optical image of the scene using an electronic-sensor array located at the focal plane of the imaging lens. A sensor array (a.k.a., focal-plane array) normally comprises a large two-dimensional array of optoelectronic detector pixels, such as charge-coupled device (CCD) elements, photodetectors, etc. The sensor array generates a digital image-data set based on the sub-image formed on its recording surface during image capture.

As digital-imaging technology has matured, sensor arrays containing ever-larger pixel counts have been developed, since an imaging system having high pixel count offers many advantages for viewing an output image. For example, an image of a total scene can be provided at improved image quality, while the improved resolution also offers the potential for enlarging the view of sub-regions of the scene to enable their examination in greater detail.

Pixel count is a basic measure of image quality and is commonly specified by the number of mega pixels an image contains. In most cases, the sensor elements are included in a single sensor array. Since the relative position of the sensor elements in a single array is known a priori and remains fixed throughout the imaging process, the use of a single sensor array facilitates the image processing required to convert raw pixel data from the sensor array into an output image in a reasonable amount of time. The total number of pixels is limited by the size of each sensor element and the practical limit for the size of the substrate on which they can be formed. A typical mobile phone or digital camera has a pixel count within the range of 8-40 million.

In many cases, it is desirable to expand the number of image pixels beyond what can be conveniently derived by imaging a scene onto a single sensor array. In the prior art, this has typically been achieved by aggregating multiple digital sub-images, each provided by a different sensor array, into a composite image that has large pixel count while maintaining high pixel density within each sub-image region. This offers performance advantages over single-sensor-array cameras, such as a wide field-of-view combined with high angular resolution, high-speed data readout, and lower cost-per-pixel compared to systems with one continuous focal-plane-array.

Panoramic imaging is an example of an application wherein multiple low-pixel-count images are combined to assemble a high-pixel-count image. Most often, a panoramic image is developed by taking a series of images from a single camera while the camera is panned and tilted during acquisition of the series. Alternatively, camera systems having multiple sensor arrays are also sometimes used.

In some cases, array cameras employing multiple single-sensor-array microcameras are used in panoramic and non-panoramic imaging applications. In such systems, each microcamera provides output data based on a different portion of a scene to a common image-aggregation processor that combines the data into a composite image of the entire scene.

Unfortunately, assembling large composite images from multiple smaller sub-images is very computationally intensive due to the geometrical and radiometric processing of the sub-images that is required to stitch the sub-images together. Further, when the sub-images are often taken at different times, the illumination of the scene can change or there can be motion artifacts associated with objects moving within the field-of-view. Still further, the responsivity of different sensor arrays can be different giving rise to variations in contrast, brightness, etc. As a result, algorithms that compare neighboring images are required in order to mitigate seams between sub-images due to these variations. In addition, distortion, pointing, and non-linearity corrections must be applied to the sub-images. Once this extensive processing is complete, a single image file having very high-pixel-count can be obtained (typically, tens of mega pixels to tens of gigapixels in size).

Such extensive processing imposes a severe time constraint, however, which has historically precluded using multiple sensor arrays for video-rate capture of high-resolution, high-pixel-count imagery. To date, therefore, high-definition video streams have been principally limited to single-sensor-array camera acquisition. As a result, in video-rate applications, numerous separately controlled cameras are typically used to capture a complete scene, where each camera provides only a small-area view of a portion of the scene. For example, a sports broadcast normally relies on the use of many different cameras that are strategically positioned and oriented throughout an arena or stadium. Each camera requires its own camera operator and the multiple camera views must be continuously analyzed in real time by a director who chooses which one camera view is broadcast. In addition to giving rise to inordinate capital and operational expense, such an approach limits the "richness" of the viewing experience.

The need for an imaging system that can provide high-resolution imagery of an entire scene at the same time remains, as yet, unmet.

SUMMARY OF THE INVENTION

The present invention enables high-speed capture and rendering of large-area, high-pixel-count images of a scene using an imaging system having multiple sensor arrays. Embodiments of the present invention are particularly well suited for use in high-definition video broadcast systems.

In the prior art, methods for stitching multiple sub-images into a single composite image require significant processing effort, which results in latencies that are not commensurate with video-rate applications. In other words, prior-art approaches to multi-sensor-array imaging cannot deliver fully stitched images to displays at video rates because of the amount of time it requires to merge the sub-images provided by the different sensor arrays. Further, the bandwidth requirement for transmitting large amounts of raw pixel-data between the imagers and the display devices would be prohibitive in its own right.

The present invention overcomes the latency and bandwidth problems of prior-art high-pixel-count imaging systems by processing only that pixel data required to render a particular view of interest. Since the viewing device is typically of much lower resolution than the final stitched image, the entire high-resolution image is not formed unless the image needs to be printed. For video-rate capture and display this is critical as the processing of the full-resolution image at video-rate would be prohibitively complex and costly. As a result, embodiments of the present invention enable faster imaging systems that are suitable for video-rate applications.

In addition, embodiments of the present invention use a captured set of images of a scene to calibrate each imager in a multi-imager system. Subsequent composite images of the scene are then formed with little or no latency by using a model derived from this calibration. In some embodiments, each image pixel in the composite image is drawn from one specific measured pixel in the system. In other words, the image data point that corresponds to each object point in the scene is taken from only one imager (e.g., from the best available imager that covers that image point), thereby avoiding the need to average image data points provided by multiple imagers having overlapping fields of view. The reduced computation time makes real-time operation of the imaging system possible.

An embodiment of the present invention is an imaging approach wherein the imaging system has a tree hierarchy, which affords scalability of architecture and of image processing. In this approach, only pixel data required to render the view of interest is processed, which enables very low latency thereby enabling interactive viewing of large image-data sets and video-rate capture, as well as rendering of very large pixel counts. Further, pixel capture, processing, and storage is distributed, allowing parallel architectures to be realized using low-cost components.

In some embodiments, low-latency interactive display of high-pixel-count data sets from a plurality of sensor arrays is enabled.

The flexible processing architecture of the present invention enables different applications to be served from the same underlying imaging system architecture.

In some embodiments, high-pixel-count tiled displays are rendered by having separate render processors, each feeding an individual display. In some embodiments, interactive displays on tablets and mobile phones are optimized by pre-caching data sets on cloud servers and distributing low-bandwidth imagery that is particularly suitable (i.e., substantially optimized) for the pixel count of that display. In some embodiments, high-quality broadcast rendering from multiple imager arrays is realized by using high-bandwidth links to arrays of rendering systems that feed into one output video display.

An embodiment of the present invention is a method for high-speed capture and rendering of a first image of a scene that includes a plurality of object points, the method comprising: storing a first set of raw image data points at a plurality of servers, the servers being operatively coupled with a first plurality of sensor arrays and a first rendering system, and the first set of raw image data points including raw-image data points from each of the first plurality of sensor arrays; determining a second set of raw image data points, the second set of raw image data points being based on a rendering request received from the first rendering system; determining a second set of sensor arrays, the second set of sensor arrays being the sensor arrays of the first set of sensor arrays that provided the second set of raw image data points; and generating a set of calibrated image data points by applying a first set of calibration factors to the second set of raw image data points, the first set of calibration factors being based on the second set of sensor arrays, wherein the first image is based on the set of calibrated image data points.

Another embodiment of the present invention is a system for high-speed capture and rendering of an image of a scene comprising a plurality of object points, the system comprising: a plurality of imagers, each imager being operative for providing image data based on object points in a different portion of the scene; a plurality of servers, each server being a capture-and-hosting server operative for storing raw image data, performing image processing, and transmitting image data at a plurality of resolutions; a first switching network; and a second switching network; wherein the plurality of imagers and the plurality of servers are operatively coupled via the first switching network such that each server can receive image data from any of the plurality of imagers; and wherein the second switching network is operative for coupling the plurality of servers and at least one rendering system such that the at least one rendering system can request and receive image data from any of the plurality of servers.

DETAILED DESCRIPTION

Figure 1A:
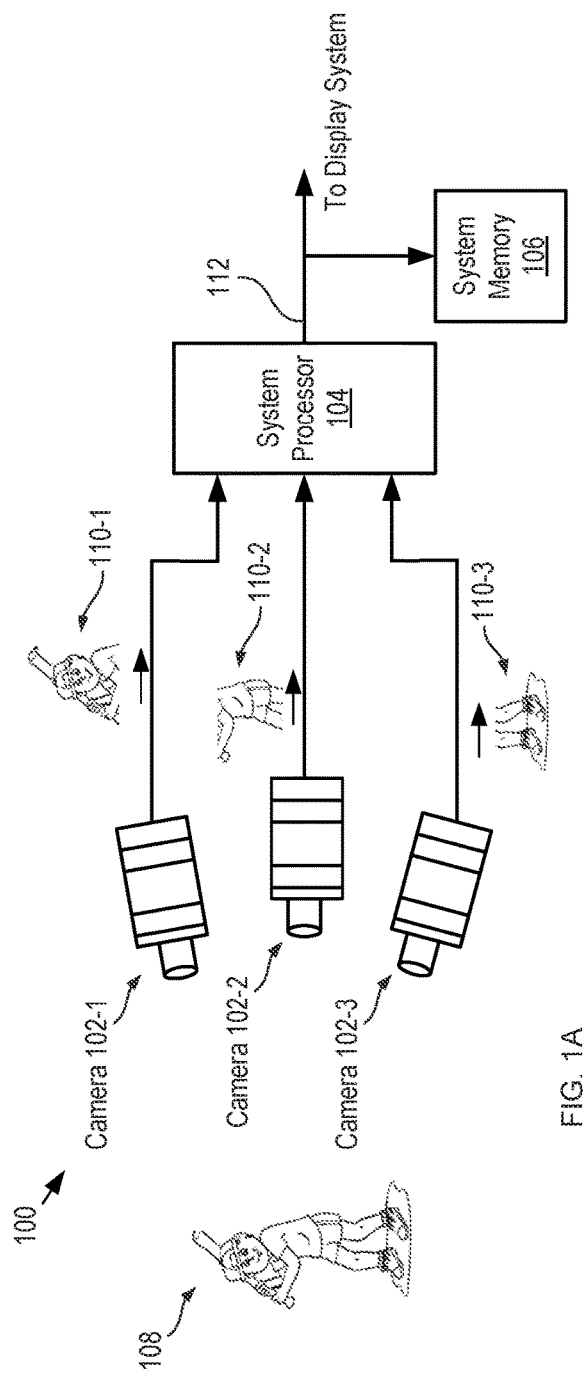
FIG. 1A-B depict schematic drawings of a conventional array camera and an individual microcamera of the array, respectively.
Figure 1B:
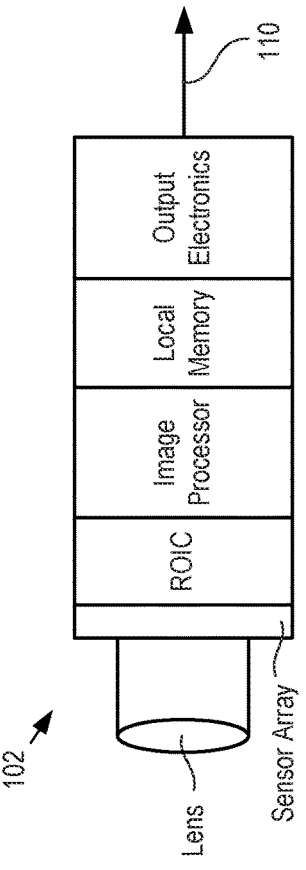

FIG. 1A-B depict schematic drawings of a conventional array camera and an individual microcamera of the array, respectively. Array camera 100 includes a plurality of microcameras 102-1 through 102-3, system processor 104, and system memory 106. Array camera 100 is representative of typical prior-art multi-sensor-array cameras wherein the sensor arrays reside in individual microcameras.

Each of microcameras 102-1 through 102-3 (referred to, collectively, as microcameras 102) is a conventional digital video camera that includes independent sensor arrays, image processing capability and memory. Each of microcameras 102 comprises an objective lens, sensor array, read-out integrated circuit (ROIC), image processor, local memory, and output electronics. Microcameras 102 are arranged such that each microcamera provides a video stream of a different portion of scene 108.

In each video frame of the video stream, the objective lens of each of microcameras 102 forms an optical image of its respective portion of scene 108 on the recording surface of its respective sensor array.

The sensor array converts the optical image into image data representative of the portion of the scene viewed by that camera. The image data generated for each video frame collectively defines an image-data set.

The image data is read out by the ROIC, which is an integrated circuit specialized for reading out image data from a sensor array and converting it into a standard image format.

The output of the ROIC is processed at the image processor, which, among other things, adjusts its image properties (e.g., white/black levels, fixed-pattern noise, gamma, etc.), demosaics color images from the raw image data, and compresses the raw image data into a standard image format (e.g., JPEG, TIFF, PNG, HDMI, H.264, HVEC, etc.).

The processed image-data set is then stored in and/or sent to system processor 104 by the output electronics as digital sub-image 110. Typically, the camera memory is a long-term data storage device, such as a hard disk drive, solid-state memory, etc.

System processor 104 is an image aggregator that, for each video frame, receives the multiple sub-images from the microcameras and uses digital image stitching to form a composite image of scene 108 using regions of overlap in the fields of view of adjacent microcameras to align them relative to one another. Typically, system processor 104 also adjusts the sub-images for brightness, contrast, and the like, so that they can be seamlessly combined into a single image. This aggregation and adjustment process occurs during each frame of a video stream to generate output signal 112, which is sent to memory 106 and/or is transmitted to a display system, such as one or more video monitors or streaming data networks. Typically, the output video stream is in a conventional format such as HDMI, H.264, HVEC, and the like.

Arraying multiple microcameras to image a scene provides many advantages over imaging the scene using a single high-resolution camera. First, since each microcamera 102 needs to view only a smaller portion of scene 108, it can employ a simpler optical design. Second, smaller sensor arrays can be used because the full scene image is formed of multiple smaller sized sub-images 110 and field curvature and image focus can be managed independently in each sub-image. This decreases the cost per detectorpixel for the sensor arrays included in cameras 102.

Unfortunately, arraying microcameras as done in the prior art, such as embodied by array camera 100, also gives rise to significant digital data management issues—particularly for live video transmission. Typically, each sensor array includes 1-20 megapixels and operates at 1-500 video frames per second. Each microcamera 102, therefore, produces up to 1000 mega pixels of data per second. As a result, array camera 100, as a whole, therefore produces 100 mega pixels to 100 gigapixels of data per second. Processing, storing, transmitting and analyzing this data load is a formidable information-management challenge.

In addition, since each of microcameras 102 includes an independent local memory, high-resolution data would be drawn from a single memory module. As a result, that camera would be required to operate at extremely high bandwidth while other camera memories would remain idle.

In some prior-art array cameras, the local memory of each microcamera is a long-term memory device, such as a solid-state memory (e.g., SD card, etc.) that must be physically removed from the microcamera and coupled with system processor 104 for image compositing. As a result, real-time processing of a composite image is simply not possible.

Figure 2:
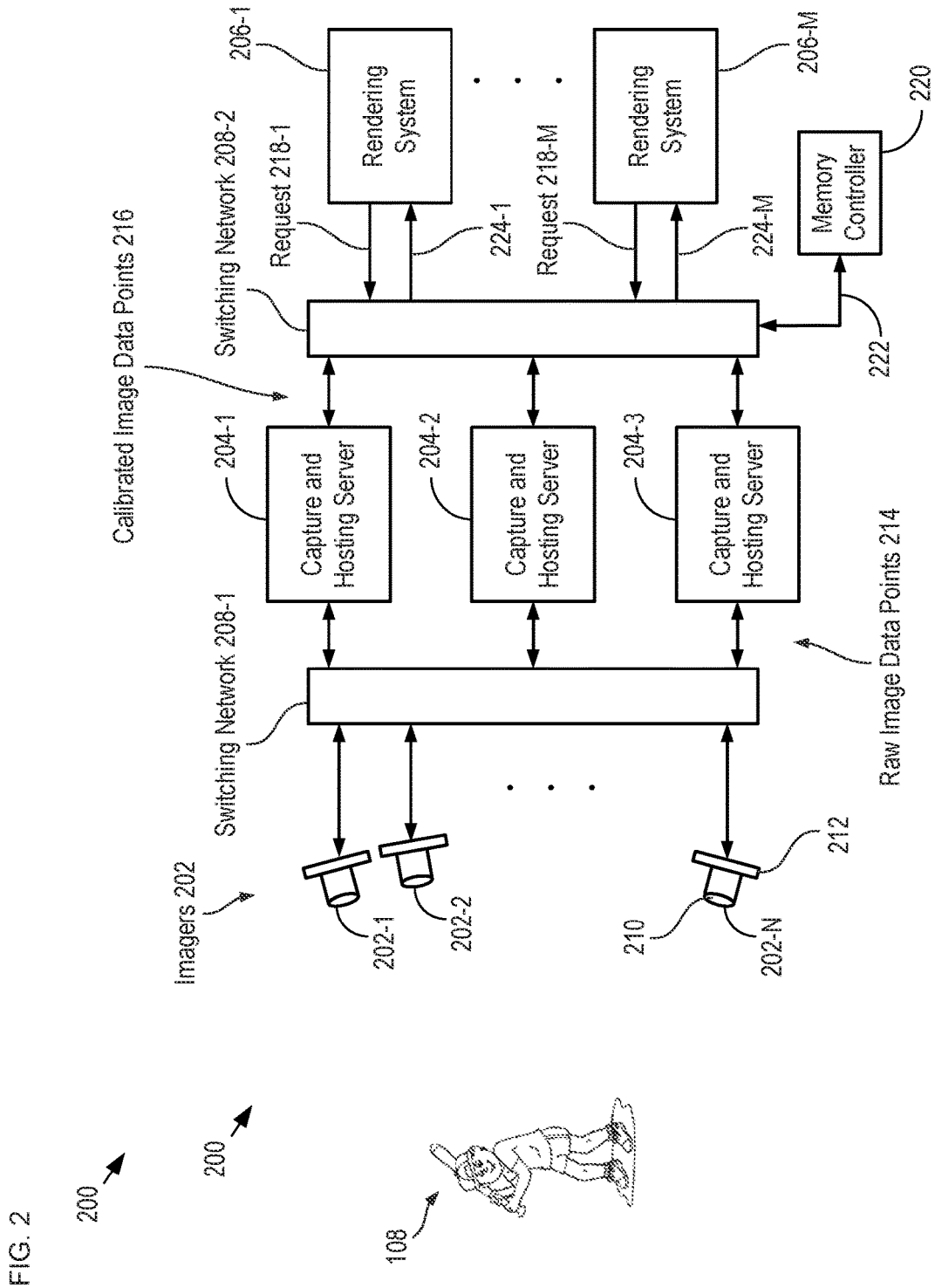
FIG. 2 depicts a schematic drawing of a system architecture in accordance with an illustrative embodiment of the present invention.

FIG. 2 depicts a schematic drawing of a system architecture in accordance with an illustrative embodiment of the present invention. System 200 includes imaging systems 202-1 through 202-N, servers 204-1 through 204-3, rendering systems 206-1 through 206-M, and memory controller 220. Imaging systems 202-1 through 202-N (referred to, collectively, as imagers 202) and servers 204 are interconnected via switching network 208-1, and servers 204 and rendering systems 206 are interconnected via switching network 208-2. System 200 is an imaging system that captures a large amount of image data by imaging a scene via multiple imagers, wherein the system makes the data from the sensor arrays of all of the imagers available to one or more rendering systems via a distributed switching network, where the raw image data is processed just prior to its rendering.

System 200 separates the processing required on the server and client sides. Typically, a viewing device has image resolution that is much lower than that of the complete fully stitched composite image. In most cases, therefore, it is necessary to form the entire high-resolution image unless it is to be printed. For video-rate applications, this is critical as the processing of a full-resolution image at video rate would be prohibitively complex and expensive.

Figure 3:
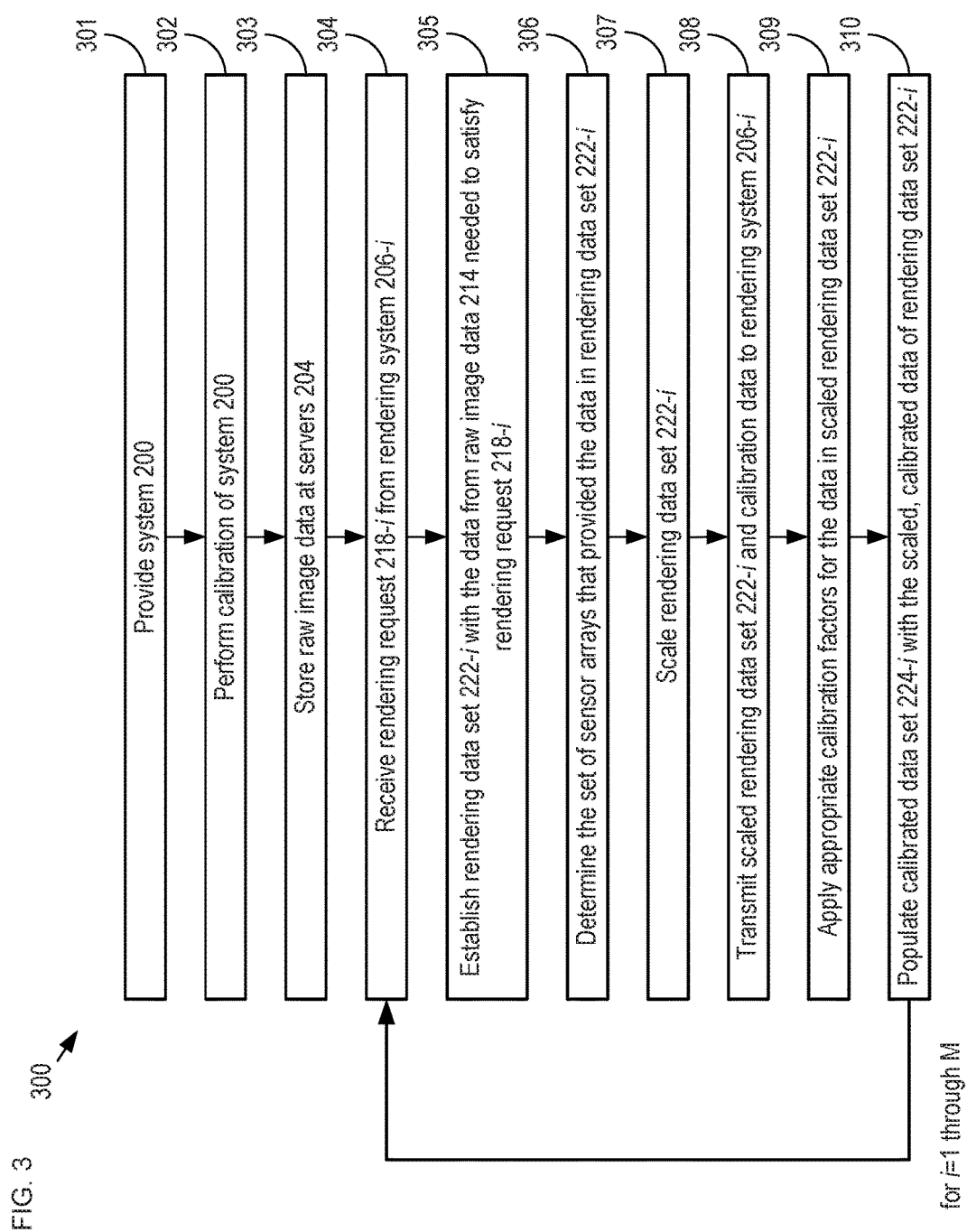
FIG. 3 depicts operations of a method for acquiring and rendering image data in accordance with the illustrative embodiment.

FIG. 3 depicts operations of a method for acquiring and rendering image data in accordance with the illustrative embodiment. Method 300 begins with operation 301, wherein system 200 is provided.

Each of imagers 202 includes an objective lens 210 and a sensor array 212 (i.e., a focal-plane array) comprising a two-dimensional arrangement of sensor elements, such as charge-coupled device (CCD) pixels, etc. In some embodiments, the imagers are complete microcameras, as described above and with respect to FIG. 1B. In some embodiments, the imagers primarily include only an imaging lens and a sensor array. Typically, imagers 202 are arranged such that the field-of-view of each imager overlaps with at least one field of view of another imager. As a result, object points in the overlap region are imaged by multiple imagers such that each of these object points corresponds to multiple image data points—each provided by the sensor array 212 of a different imager 202. Imagers 202 are arranged such that their sensor arrays capture object points over the entirety of scene 108. In some embodiments, one or more of imagers 202 includes a unique lens assembly or orientation, which is mated to its corresponding sensor array 212, thereby realizing further capabilities in having a discontinuous focal surface and low-cost lens assemblies. In some embodiments, imagers 202 collectively include a common objective lens that forms an optical image of scene 108 at a focal field, at which the plurality of sensor arrays 212 are arranged.

Sensor arrays 212 are interconnected to servers 204-1 through 204-3 via switching network 208-1, which is a mesh-connected network of data pipelines that enables any server 204 to receive raw image data 214 from any of the sensor arrays.

In addition, each of servers 204 is interconnected with each of rendering systems 206-1 through 206-M (referred to, collectively, as rendering systems 206) via switching network 208-2, which is analogous to switching network 208-1.

As a result, any rendering system can communicate with any of servers 204-1 through 204-3 to request image data at any desired resolution, and any of the servers can provide image data to any rendering system at the resolution demanded by that rendering system.

Rendering systems 206 are conventional rendering systems, such as high-definition displays, computer monitors, smart phones, tablets, and the like. In some embodiments, rendering systems 206 include a mix of rendering system types.

Each of servers 204-1 through 204-3 is a capture and hosting server that can store raw image data 214, perform processing in order to provide image data to a rendering system at its desired resolution, etc. It should be noted that, although the illustrative embodiment includes three servers, any practical number of servers can be included in system 200 without departing from the scope of the present invention. In some embodiments, raw image data 214 is divided equally among the servers, with some overlap, such that each server handles a substantially equal amount of the raw image-pixel information. As a result, the processing required to provide image data at a desired resolution can be done in parallel, reducing the normal latency time required for such an operation.

By performing image processing at the server side, sub-images can be provided to the rendering systems at the proper resolution for the required rendering resolution. This reduces the bandwidth and processing requirements on the rendering system. Additionally, image pre-processing can occur either: (1) before the servers on additional, dedicated hardware; (2) on the servers; or (3) on the rendering systems themselves. This allows the relative cost, bandwidth, latency, and performance to be optimized for different applications. For example, widely distributed interactive content from array cameras could be optimized for simple processing on the rendering side by having high-performance capture-and-hosting servers. Alternatively, high-quality low-latency streaming for broadcasters can be optimized by having a high-performance rendering system with high-bandwidth links to the capture and hosting servers.

Memory controller 220 is a system processor that includes processing capability enabling it route image data for storage in servers 204, maintain a routing table for the stored image data, receive and manage rendering requests from rendering systems 206, map fields-of-view with sensor array pixels, execute instructions, and the like. In some embodiments, memory controller functionality is included in at least one of servers 204 and memory controller 220 is not included.

At operation 302, system 200 is calibrated. Calibration of system 200 typically includes both radiometric and geometric calibration. Radiometric calibration, in part, accounts for the variations in sensor-pixel sensitivities and optical variations of each sensor array's optical system. Radiometric calibration of system 200 begins by placing a known target such that it can be imaged by all of imagers 202. A diffusing object is then placed front of each imager. This enables the relative responses of all the pixels in the sensor arrays to be calibrated to match the same value. White-balance calibration is done by ensuring that the sensor array 212 of each imager in the array produces the same R-G-B value for the test target.

Geometric calibration of system 200 is best done using a real image scene with distinct features. Overlap in the fields of view of the individual imagers is used to calculate the pointing (yaw, pitch, roll), magnification, and distortion of each imager. As discussed below, once a captured set of images has been used to calibrate system 200, transformations are computed to develop a model that can then be applied in real time to subsequent image data provided by each imager when the data is sent to each rendering system to recreate its desired view of interest from the captured data.

Geometric calibration is performed in similar fashion to pixel processing during normal operation of system 200, wherein a sub-set of raw image data 214 is transformed in a step-by-step process into a high-quality, full-color image suitable for rendering at the final display.

Figure 4:
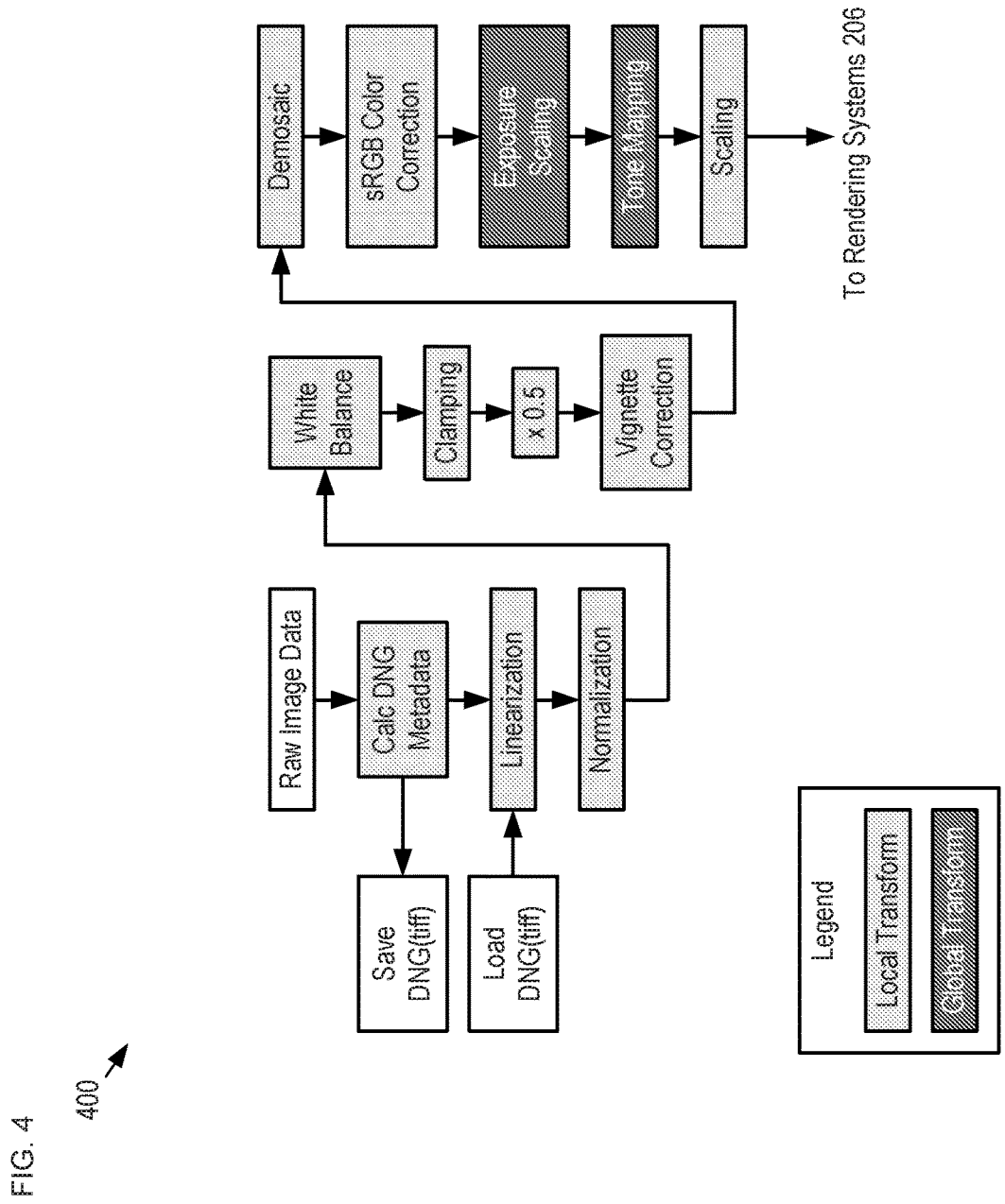
FIG. 4 depicts a pixel-processing pipeline in accordance with the illustrative embodiment of the present invention.

FIG. 4 depicts a pixel-processing pipeline in accordance with the illustrative embodiment of the present invention. Process 400 begins with the conversion of raw image data 214 into a digital negative (DNG). It should be noted that, once a DNG has been saved, the pixel-processing pipeline can begin with loading that previously saved DNG.

Save/load DNG—in order to archive the raw data from the imager array the raw data can be saved along with its associated metadata (exposure time, focus setting, gain settings, etc.) to allow for variations in the pixel processing pipeline at a future time. A DNG is a standard format for archiving raw data from camera systems. Saving imagery could also be done further in the pipeline, although with the risk of being unable to completely recreate the captured sensor data.

This is then followed by linearization. Sensor data is normally compressed near the focal plane array for delivery to the capture and hosting server. Currently, compression is performing a gamma transform on the input data (out=in^gamma) where in and out go from 0 to 1. This compression is undone at the linearization step to allow for subsequent linear processing.

Normalization is then performed, where the image data is normalized from 0 to 1 by defining a white point (typically the saturation level of the image sensor) and a black point (the lowest value from the analog-to-digital converter on the image sensor which is typically greater than 0). The linearized data is transformed by applying out=(in-black_point)/(white_point-black_point).

White balance is then performed. Due to the different illumination conditions and different spectral responsivities of the image sensors, the different color channels of the image sensor need to scaled by a vector of length N, where N is the number of independent color readout channels of the images sensor. N is typically 4 for color image sensors with Bayer patterns (2 green, 1 red, 1 blue). This white balance vector is calculate using a combination of sensor calibration and scene color temperature.

After white balancing, in order to prevent the white balance procedure from forcing the sensor pixel data above its saturation limit, the data is clamped. The white balance coefficients are chosen to always be greater than 1, and after linearization all sensor data is between 0 and 1, so the clamping involves forcing all pixel data that is greater than 1 to be 1.

When combining image data from multiple sensors, the intensity roll-off at the edges of each image sensor (vignetting) must be taken into account. The vignetting function, typically an $11^{th}$ order polynomial is found during the calibration procedure. The 0.5× multiplier before the vignetting function ensures that pixels are not saturated by the vignetting removal process. Since vignetting is applied over all color channels there is no risk of pixel saturation as in the white balance procedure.

Once vignetting has been accounted for, the raw image data is a mosaicked capture of different color channels at different pixel locations. To recover red, green, and blue imagery at each pixel conventional demosaicking is applied. One key aspect of this approach is that it is a very computationally expensive part of the render pipeline, and hence can be optimized for use on graphical processing units (GPUs) to ensure real-time operation or be done by dedicated hardware application-specific integrated circuits (ASICs).

After demosaicking, the pixel colors are specific to the color filters of the image sensor. Color correction is required to match the spectral characteristics of standard display monitors. A 3×3 matrix is found during sensor calibration that when each R-G-B pixel is multiplied by produces a color-corrected R-G-B pixel. This matrix could be found each image sensor separately or calibrated for sensors of the same make and model.

The imagery must be scaled in the pipeline to take into account the fact that the images from each imager must be allowed to have different exposure times. This is particularly important for imager arrays where the scene brightness can vary by many orders of magnitude. By including local exposure control, imagery can be captured that doesn't have excessive saturation or shadow noise. As this is the first global transform (i.e. needs information from other imagers in the array for it to be fully applied) it is preferably applied at the render side of the processing chain to reduce bandwidth. Since the scenes can have a wide dynamic range, scaling them by their exposure time will make the resultant image data be of a high dynamic range. By sending image data before this transform is applied, a much lower bit-depth is required.

Finally, the mapping from the bit levels of the image sensor to the intensity levels of the physical display is critical to the display of any image (i.e., tone mapping). Tone mapping is typically optimized for end consumption by the human visual system from an electronic display. Similar to the exposure scaling this is a global transform that's application depends on the entire scene. It is best applied, therefore, in tandem with exposure scaling to reduce the data bandwidth to the display.

Once system 200 has been calibrated, the system is ready to respond to rendering requests from rendering systems 206.

Returning now to method 300, at operation 303, raw image data 214 is stored in servers 204-1 through 204-3. In the example provided here, raw image data from each imager, which images roughly one-third of the entire field-of-view of system 200, is stored at each server. Typically, image data in the regions where these sub-fields of view meet is stored in more than one server.

At operation 304, for i=1 through M, a rendering request 218-$i$ is received from at least one rendering system 206-$i$. One skilled in the art will recognize that a typical rendering request includes specification of the desired field of view (e.g., the desired horizontal and vertical included angles), the resolution at which the image is to be displayed, and the desired time to which the image data should correspond.

At operation 305, memory controller 220 determines which data of raw image data 214 is necessary to satisfy rendering request 218-$i$ and establishes rendering data set 222-$i$.

At operation 306, the set of imagers 202 that provided the data in rendering data set 222-$i$ is determined. In some embodiments, image data for an object point (i.e., measured pixel) viewed by multiple imagers is selected from the best available imager that views that image point. The best available imager is determined from the system model developed during calibration of system 200. It should be noted that selecting a specific measured pixel makes averaging image data from multiple imagers unnecessary, which affords embodiments of the present invention significant advantages over prior-art imaging systems by eliminating significant computation time that can make real-time operation difficult, if not impossible.

At operation 307, scaling is applied to rendering data set 222-$i$ based on the resolution specified in the rendering request.

At operation 308, the scaled image data in rendering data set 222-$i$ is transmitted to rendering system 206-$i$.

At operation 309, the scaled raw image data in rendering data set 222-$i$ is processed by applying the calibration factors for each imager and sensor array in the set of imagers to generate calibrated image data. It should be noted that embodiments of the present invention are afforded particular advantage over the prior art by transmitting the calibration factors and substantially raw image data to the rendering system, thereby enabling the rendering system to perform the processing of the image data. Specifically, such an approach reduces latency due to computation and requires significantly lower communications bandwidth.

At operation 310, calibrated data set 224-$i$ is populated with the scaled and calibrated image data.

After the completion of operation 310, the desired image, at its desired resolution, can be displayed by rendering system 206-$i$.

Although it is preferable that calibration of the image data is performed at each rendering system 206-$i$, in some embodiments, the image data is processed at servers 204 and the calibrated image data set is sent to the rendering systems in operation 310. By performing the processing at the servers, fewer operations must be performed and, therefore, simpler rendering systems can be used. Further, if the image data is processed at the servers, multiple, simple clients can be supported at the rendering side with minimal additional processing since the image processing would only have to be performed once.

It should be noted that method 300 affords several advantages over imaging systems of the prior art. First, only those image pixels necessary to satisfy a rendering request are processed. This greatly reduces the processing requirements and mitigates latency associated with rendering an image comprising image data obtained from multiple imagers. Second, graphical processing can be performed in parallel by any combination of servers 204, which also reduces latency due to image processing.

It is an aspect of the present invention that a composite image derived from image data provided by multiple imagers can be formed with little or no latency by using a model developed during calibration of the overall system. In some embodiments, each pixel in the composite image is drawn from a specific measured pixel in the system. Specifically, the image data point for each object point is selected from only one imager (e.g., from the best available imager that covers that object point). As a result, the typical computation time required to average image data for an object point covered by multiple imagers is avoided, thereby enabling real-time operation of a multi-imager imaging system. In embodiments of the present invention, the calibration of the overall system is preferably performed by using a captured set of images.

It should also be noted that an alternative to the illustrative embodiment could entail stitching every frame from sensor arrays 202 into one large stitched image using panoramic stitching approaches. The disadvantage of such an approach, however, would be the inordinate latency involved, which would substantially preclude an ability to operate at video rates. Further, such an approach would require such large bandwidth to deliver the fully stitched image to displays as to be impractical.

It is to be understood that the disclosure teaches some examples of embodiments of the present invention and that many variations of the invention can easily be devised by those skilled in the art after reading this disclosure and that the scope of the present invention is to be determined by the following claims.

What is claimed is:

1. A method for high-speed capture and rendering of a first image of a scene that includes a plurality of object points, the method comprising:
    storing a first set of raw image data points (214) at a plurality of servers (204), the servers being operatively coupled with a first plurality of sensor arrays (212) and a first rendering system (206-i), and the first set of raw image data points including raw-image data points from each of the first plurality of sensor arrays;
    determining a second set of raw image data points (222-i) based on a rendering request (218-i) received from the first rendering system;
    determining a second set of sensor arrays, the second set of sensor arrays being the sensor arrays of the first set of sensor arrays that provided the second set of raw image data points; and
    generating a set of calibrated image data points (224-i) by applying a first set of calibration factors to the second set of raw image data points, the first set of calibration factors being based on the second set of sensor arrays, wherein the first image of the scene is based on the set of calibrated image data points.

2. The method of claim 1 further comprising:
    transmitting the first set of calibration factors to the first rendering system; and
    transmitting the second set of raw image data points to the first rendering system;
    wherein the first set of calibration factors are applied to the second set of raw image data points at the first rendering system.

3. The method of claim 1 further comprising applying a scaling factor to the second set of raw image data points (222-i), the scaling factor being based on the rendering request.

4. The method of claim 1 further comprising determining a second set of calibration factors that includes the first set of calibration factors, the second set of calibration factors being based on the first set of sensor arrays.

5. The method of claim 4 wherein the second set of calibration factors include at least one of radiometric calibration factors and geometric calibration factors.

6. The method of claim 4 wherein the second set of calibration factors include both radiometric calibration factors and geometric calibration factors.

7. The method of claim 1 wherein the second set of sensor arrays includes fewer elements than the first set of sensor arrays.

8. The method of claim 7 wherein the first set of calibration factors is based on only the second set of sensor arrays.

9. The method of claim 1 further comprising:
    determining a second set of calibration factors that includes the first set of calibration factors, the second set of calibration factors being based on a first set of images;
    computing a model that is based on the second set of calibration factors; and
    generating the first set of calibration factors based on the model.

10. The method of claim 9 further comprising:
    providing a first raw image data point that corresponds to a first object point, the first raw image data point being provided by a first sensor array of the first set thereof;
    providing a second raw image data point that corresponds to the first object point, the second raw image data point being provided by a second sensor array of the first set thereof; and
    selecting only one of the first raw image data point and second raw image point for inclusion in the second set of raw image data points based on the first set of calibration factors.

* * * * *